(12) United States Patent
Vassilicos (10) Patent No.: US 10,118,140 B2
(45) Date of Patent: Nov. 6, 2018

(54) FLUID FLOW MODIFICATION APPARATUS USING FRACTAL CONFIGURATIONS

(71) Applicant: IMPERIAL INNOVATIONS LTD., London (GB)

(72) Inventor: John Christos Vassilicos, London (GB)

(73) Assignee: IMPERIAL INNOVATIONS LTD., London (GB)

( * ) Notice: Subject to any disclaimer, the term of this patent is extended or adjusted under 35 U.S.C. 154(b) by 488 days.

(21) Appl. No.: 14/810,267

(22) Filed: Jul. 27, 2015

(65) Prior Publication Data

US 2015/0328601 A1 Nov. 19, 2015

Related U.S. Application Data

(63) Continuation of application No. PCT/GB2014/050216, filed on Jan. 28, 2014.

(30) Foreign Application Priority Data

Jan. 30, 2013 (GB) .................................. 1301655.5

(51) Int. Cl.
*B01F 5/00* (2006.01)
*B01F 5/06* (2006.01)
*F15D 1/02* (2006.01)

(52) U.S. Cl.
CPC .......... *B01F 5/0602* (2013.01); *B01F 5/0601* (2013.01); *B01F 5/0693* (2013.01); *F15D 1/025* (2013.01)

(58) Field of Classification Search
CPC .... B01F 5/0602; B01F 5/0693; B01F 5/0601; B01F 15/0264; F15D 1/025
See application file for complete search history.

(56) References Cited

U.S. PATENT DOCUMENTS 4,537,217 A * 8/1985 Allen, Jr. ............... B01D 15/14
137/561 A
5,938,333 A * 8/1999 Kearney ............... B01F 5/0601
138/42

(Continued)

FOREIGN PATENT DOCUMENTS

DE 10210062892 A1 6/2012
EP 2274523 A1 10/2011

(Continued)

OTHER PUBLICATIONS

International Search Report and Written Opinion dated Jun. 13, 2014 for related application No. PCT/GB2014/050216 filed Jan. 28, 2014 and published as WO/2014/118521 Aug. 7, 2014.

*Primary Examiner* — Charles Cooley
(74) *Attorney, Agent, or Firm* — EIP US LLP (57) ABSTRACT

A fluid flow modification apparatus has a plurality of flow modification elements each having a first surface portion against which a fluid (F) can flow and a second surface portion along which the fluid (F) can flow. The elements are arranged in a number of sets. A first set of elements comprises a plurality of fluid flow modification elements with a first surface portion. A second set of elements comprises a plurality of fluid flow modification elements with a first surface portion having a surface area different from that of the first set. The first set of elements includes first and second types of fluid flow modification elements. The depth of the second surface portion is different from the depth of the second surface portion.

13 Claims, 7 Drawing Sheets

(56) References Cited

U.S. PATENT DOCUMENTS

| | | | | |
|---|---|---|---|---|
| 6,333,019 B1 * | 12/2001 | Coppens | ............... | B01F 5/06 23/293 R |
| 6,616,327 B1 * | 9/2003 | Kearney | ............... | B01F 5/06 366/340 |
| 6,688,381 B2 * | 2/2004 | Pence | ............... | B01F 5/06 165/139 |
| 6,742,924 B2 * | 6/2004 | Kearney | ............... | B01F 5/06 138/42 |
| 7,014,442 B2 * | 3/2006 | Haynes | ............... | B29C 47/70 425/131.5 |
| 7,390,408 B2 * | 6/2008 | Kearney | ............... | B01D 15/14 210/282 |
| RE42,882 E * | 11/2011 | Kearney | ............... | B01F 5/06 138/42 |
| 8,511,889 B2 * | 8/2013 | Choikhet | ............... | B01F 5/064 138/40 |
| 9,138,699 B2 * | 9/2015 | Kulkarni | ............... | B01F 7/32 |
| 9,383,344 B2 * | 7/2016 | Klepp | ............... | G01N 30/6017 |
| 2002/0080563 A1 * | 6/2002 | Pence | ............... | B01F 5/06 361/676 |
| 2002/0196706 A1 * | 12/2002 | Kearney | ............... | B01F 5/06 366/336 |
| 2004/0213084 A1 * | 10/2004 | Kearney | ............... | B01F 5/06 366/336 |
| 2005/0000879 A1 * | 1/2005 | Kearney | ............... | B01D 15/14 210/287 |
| 2007/0297285 A1 * | 12/2007 | Cross | ............... | B01D 3/008 366/340 |
| 2010/0226202 A1 * | 9/2010 | Vassilicos | ............... | B01F 5/0601 366/336 |
| 2011/0080802 A1 * | 4/2011 | Vassilicos | ............... | B01F 5/0601 366/337 |
| 2011/0179858 A1 | 7/2011 | Mais | | |
| 2013/0170999 A1 * | 7/2013 | Vassilicos | ............... | F15D 1/10 416/223 R |
| 2013/0208560 A1 * | 8/2013 | Kulkarni | ............... | B01F 7/32 366/343 |
| 2015/0328601 A1 * | 11/2015 | Vassilicos | ............... | F15D 1/025 366/336 |

FOREIGN PATENT DOCUMENTS

| | | |
|---|---|---|
| GB | 1469648 A | 4/1977 |
| WO | WO90/00930 A1 * | 2/1990 |
| WO | 2007113335 A2 | 10/2007 |
| WO | 2009124939 A1 | 10/2009 |

* cited by examiner

FLUID FLOW MODIFICATION APPARATUS USING FRACTAL CONFIGURATIONS

CROSS-REFERENCE TO RELATED APPLICATIONS

This application is a continuation under 35 U.S.C. § 120 of International Application No. PCT/GB2014/050216, filed Jan. 28, 2014 (published by the International Bureau as International Publication No. WO/2014/118521 on Aug. 7, 2014), which claims priority to GB Application No. 1301655.5, filed Jan. 30, 2013. The entire contents of each of the above-referenced patent applications are hereby incorporated by reference.

BACKGROUND OF THE INVENTION

Field of the Invention

This application relates to a fluid flow modification apparatus for modifying the characteristics of a flow field, and to a method of modifying fluid flow.

Description of the Related Technology

There are many situations in which it is desirable to modify the flow of a fluid. Examples include in ventilation and fluid mixing, and for controlling fluid flow around bodies, such as fluid flow around aircraft, fluid flow around motor vehicles and fluid flow in mixing apparatus.

As a particular example, it is important when analyzing fluid flow in a test environment to be able to accurately replicate fluid flow conditions which will be encountered during actual use of a product to be tested. Products to be tested under specific fluid flow conditions vary considerably so flexibility in the ability to modify the fluid flow conditions in the test environment is essential.

It will be appreciated that for some products, providing a suitable test environment for analyzing fluid flow conditions can be very demanding. A particular challenge is encountered, for example, when testing constructional components that will be exposed to fluid flow conditions at the top of tall buildings, such as skyscrapers, or on other high constructional installations, such as bridges and wind turbines. The eddy currents in these situations, in particular, can be extremely difficult to replicate, particularly at a sufficiently small scale to allow a practical test environment to be provided.

Currently, such testing generally involves randomly arranging artefacts within a fluid flow in a wind tunnel to affect the fluid flow in such a way that the real fluid flow conditions can be replicated. Usually, the artefacts used are in the form of projections arranged so that they extend substantially vertically into the fluid flow from a base of the wind tunnel. Deciding on the location and size of the projections, however, involves a complex iterative process which can be time-consuming and unpredictable. Control of wakes arising from artefacts in the test environment is also an important factor. By determining and controlling the location at which various wakes meet, for example, turbulence intensity downstream of the artefact can be affected.

Another consideration is the minimization of the work that is required to be done in the test environment to replicate the fluid flow conditions in real life. Drag, in particular, should be reduced as much as possible to ensure that the work done within the wind tunnel is kept to a minimum, and to enable the tunnel to work at higher wind speeds.

Aside from the difficulties in achieving effective fluid flow modification in a test environment, the extent to which real fluid flow conditions are replicated is often inadequate.

SUMMARY

In accordance with one aspect, there is provided a fluid flow modification apparatus comprising:
a plurality of flow modification elements each having a first surface portion against which a fluid (F) can flow and a second surface portion along which the fluid (F) can flow, said plurality of flow modification elements being arranged in a number of sets, wherein
a first set of fluid flow modification elements comprises a plurality of fluid flow modification elements with a first surface portion having a first surface area; and
a second set of fluid flow modification elements comprises a plurality of fluid flow modification elements with a first surface portion having a second surface area different to the first surface area, and wherein
the first set of fluid flow modification elements includes a first type of fluid flow modification element and a second type of fluid flow modification element, a depth of the second surface portion in the direction of flow of the fluid of the first type of fluid flow modification element being different from a depth of the second surface portion in the direction of flow of the fluid of the second type of fluid flow modification element.

Including fluid flow modification elements of different depth in the direction of fluid flow within a set of fluid flow modification elements enables better control of wakes created by the fluid flow modification elements, particularly control of where various wakes meet, and also allows drag to be reduced to an acceptable level.

In an embodiment, the first type of fluid flow modification element in the first set of fluid flow modification elements has a first surface portion surface area that is different from a first surface portion surface area of the second type of fluid flow modification element in the first set of fluid flow modification elements. This enhances the ability to control wake location, particularly where different wakes meet. It will be appreciated that the first surface portion surface area of the first type of fluid flow modification element in the first set of fluid flow modification elements can differ from the first surface portion surface area of the second type of fluid flow modification element in the first set of fluid flow modification elements by varying the width and/or the length of the first surface portions of the respective first and second types of fluid flow modification elements.

In a further embodiment, the second set of fluid flow modification elements includes a first type of fluid flow modification element and a second type of fluid flow modification element, a depth of the second surface portion in the direction of flow of the fluid of the first type of fluid flow modification element being different from a depth of the second surface portion in the direction of flow of the fluid of the second type of fluid flow modification element. This further improves the ability to control wakes and reduce drag within a test environment.

In another embodiment, the first set of fluid flow modification elements and the second set of fluid flow modification elements are arranged in a fractal or multi-scale configuration. The first set of fluid flow modification elements can be arranged at a first level of the fractal configuration, for example, and the second set of fluid flow modification elements can be arranged at a second level of the fractal configuration.

In a yet further embodiment, a support is provided on the fluid flow modification apparatus for mounting the apparatus, in use. This enables convenient mounting of the fluid flow modification apparatus within a test environment, such as a wind tunnel, and provides flexibility in the test environment in which it can be used because the fluid flow modification apparatus does not have to be integrated with mounting devices within the test environment.

The fluid flow modification elements within the respective first and second sets of fluid flow modification elements can be attached to one another or integrally formed with one another, which provides considerable manufacturing flexibility.

Depending on the fluid flow conditions that are required to be generated, the fluid flow modification elements within the respective first and second sets of fluid flow modification elements can be joined to one another part-way along their length or end to end.

In an embodiment, the fluid flow modification elements are, preferably, generally elongate in configuration.

In a further embodiment, the first type of fluid flow modification element and the second type of fluid flow modification element are each arranged substantially symmetrically about a center point of the fluid flow modification element. This has the result of achieving a symmetrical flow pattern downstream of the fluid flow modification apparatus.

It has been found that a ratio of the depth of the second surface portion of at least one of the fluid flow modification elements in the direction of flow of the fluid (F) to a width of the first surface portion of said fluid flow modification element across the direction of flow of the fluid (F) should be within the range 0.1 to 10 in certain embodiments. For modifying fluid flow characteristics to replicate fluid flow conditions in certain conditions, for example, at the top of tall buildings and other tall constructions, it has been determined that a ratio of the depth of the second surface portion of at least one of the fluid flow modification elements in the direction of flow of the fluid (F) to a width of the first surface portion of said fluid flow modification element across the direction of flow of the fluid (F) of 0.6 is advantageous.

In accordance with another aspect of the present invention, there is provided a method of modifying fluid flow comprising inserting a fluid flow modification apparatus as described above into a fluid flow and supporting the apparatus within that fluid flow.

Further features and advantages of the invention will become apparent from the following description of preferred embodiments, given by way of example only, which is made with reference to the accompanying drawings.

BRIEF DESCRIPTION OF THE DRAWINGS

FIG. 4b shows a top view of the embodiment shown in FIG. 4a;

FIG. 4c shows a side view of the embodiment shown in FIG. 4a;

DETAILED DESCRIPTION OF CERTAIN INVENTIVE EMBODIMENTS

Various embodiments of fluid flow modification apparatus will be described herein, all of which are intended to be used for controlling the properties of a flow field and affecting its characteristics.

Figure 1A:
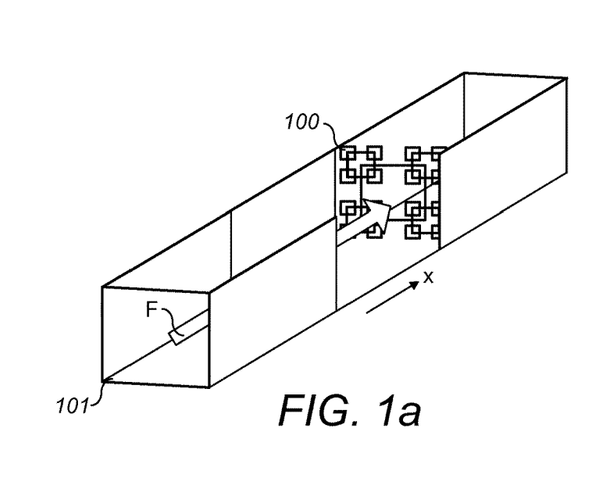
FIG. 1a is a schematic diagram of an example of an environment in which a fluid flow modification apparatus according to embodiments can operate.

FIG. 1a illustrates schematically that there is relative movement in a flow field within a conduit 101 between a fluid F flowing through the conduit 101, and a fluid flow modification apparatus 100 arranged transverse to a direction of flow of fluid F in the conduit 101. The conduit 101, which for clarity purposes is shown partly open in FIG. 1a, can be any channel suitable for carrying fluid. It can be of a rectangular, circular or any other suitable cross-section that permits arrangement of a fluid flow modification apparatus 100 therein.

Figure 1B:
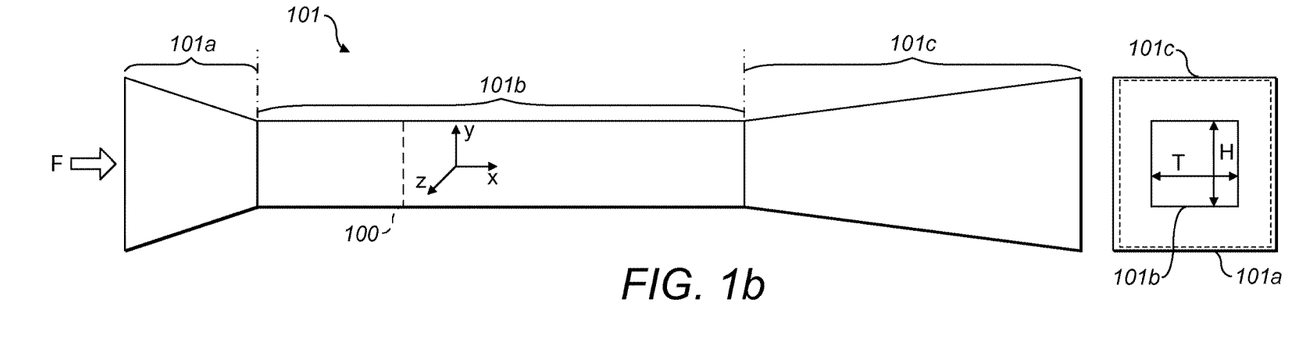
FIG. 1b shows a side and end view of an example of an environment in which a fluid flow modification apparatus according to embodiments can operate.

The conduit 101 may comprise a wind tunnel, as shown in FIG. 1b for example. As is known in the art, a wind tunnel typically includes a contraction section 101a for directing fluid into a test section 101b where flow field characteristics can be analyzed, and an exit section 101c, which acts to diffuse the fluid as it exits the conduit. The test section 101b of the wind tunnel of FIG. 1b has a rectangular cross section, of internal width T and height H, and the fluid flow modification apparatus 100 can be arranged therein across the fluid flow so that it extends across the full width T and height H of the test section 101b. The wind tunnel may have a support on which the fluid flow modification apparatus 100 can be mounted. Alternatively, the fluid flow modification apparatus 100 can be self-supporting, either independently or by virtue of an integral support. As a further alternative, a separate support that is neither part of the wind tunnel nor part of the fluid flow modification apparatus 100 can be provided to mount the fluid flow modification apparatus 100 in the wind tunnel.

Figure 2:
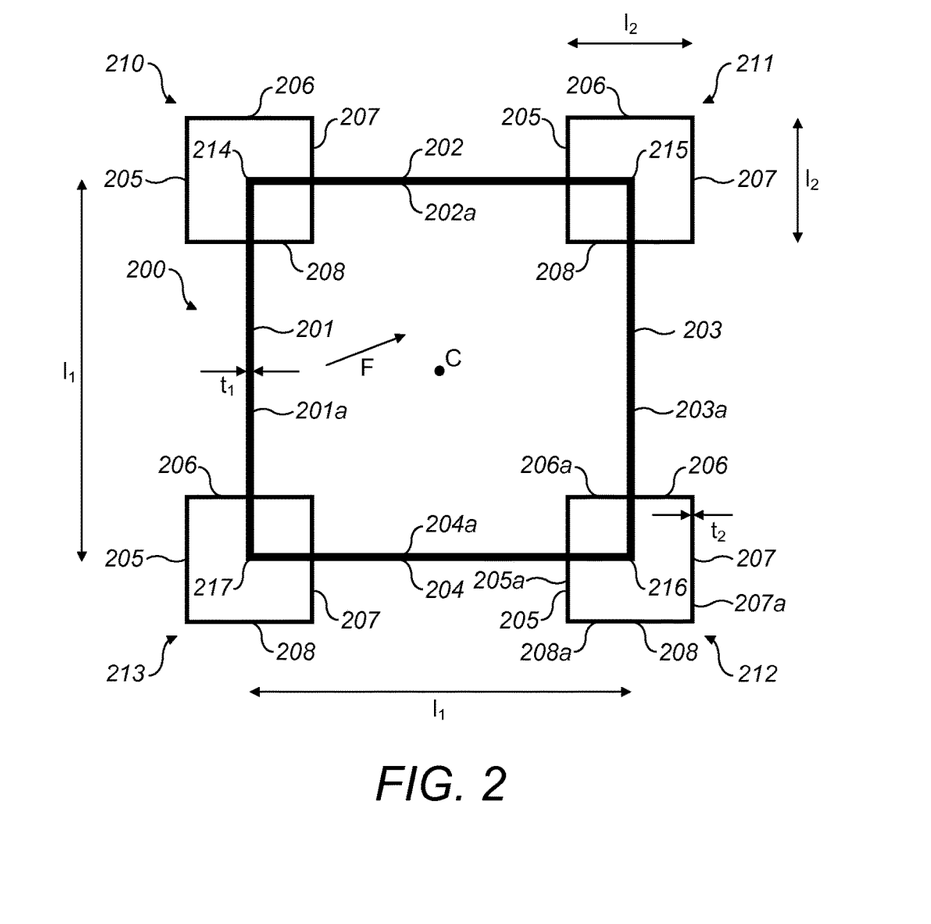
FIG. 2 shows a front view of an example of a fluid flow modification apparatus according to an embodiment.

An example of an embodiment of a fluid flow modification apparatus 200, which is in the form of a grid, is shown in FIG. 2. The grid 200 comprises a plurality of fluid flow modification elements which are in the form of generally elongate members 201, 202, 203, 204, 205, 206, 207 and 208. The generally elongate members 201, 202, 203, 204 are attached end to end to form a first set of fluid flow modification elements in a square configuration and the generally elongate members 205, 206, 207 and 208 form a second set of fluid flow modification elements, separated into four groups or structures 210, 211, 212 and 213, each of which has a generally elongate member 205, 206, 207, 208 arranged end to end to form a square. It will be appreciated that a square configuration could be replaced by a rectangular configuration or any other suitable configuration. The arrangement of the generally elongate members 201-204 or 205-208 end to end can be achieved by attaching individual elongate members 201, 202, 203 and 204, or 205, 206, 207 and 208 to one another (possibly removably) or by integrally forming the elongate members 201, 202, 203 and 204, or 205, 206, 207 and 208. Each group of generally elongate members 205, 206, 207, 208 in the second set of fluid flow modification elements is attached or integrally formed with at least one elongate member 201, 202, 203, 204 of the first set of fluid flow modification elements. For example, as shown in FIG. 2, a first group or structure 210 of fluid flow modification elements in the second set of fluid flow modification elements is attached to generally elongate members 201 and 202 in the first set of fluid flow modification elements in the vicinity of a point 214 at which the generally elongate members 201 and 202 are joined to one another. Groups 211, 212 and 213 of fluid flow modification elements in the second set of fluid flow modification elements similarly join the first set of fluid flow modification elements in the vicinity of points 215, 216 and 217 at which generally elongate members 202 and 203, 203 and 204, and 204 and 201 are respectively joined.

It can be seen in FIG. 2 that each elongate member 201-208 has a first surface portion 201$a$-208$a$, respectively, against which the fluid F can flow. Each elongate member 201-208 also has a second surface portion along which the fluid F can flow; since FIG. 2 is a front view, the second surface portion of each elongate member 201-208 is not visible but it will be appreciated that it extends behind the first surface portion 201$a$-208$a$ in each case, substantially perpendicular thereto and parallel to the direction of flow of the fluid F.

The first surface portion (generally transverse to the direction of fluid flow) of each elongate member 201-208 in FIG. 2 has a thickness or width and a length. For each of the elongate members 201-204, the thickness of the first surface portion is t1 and the length is l1, and for each of the elongate members 205-208, the thickness of the first surface portion is t2 and the length is l2. It will be appreciated that the surface area of the first surface portion 201$a$-208$a$ of any of the generally elongate members 201-208 can be varied by adjusting the thickness, t1 or t2, and/or by altering the length, l1 or l2. The surface area of the first surface portion 205$a$-208$a$ of each elongate member 205-208 in the second set of fluid flow modification elements, which is substantially equal for each elongate member 205-208, is smaller than that of the first surface portion 201$a$-204$a$ of each elongate member 201-204 in the first set of fluid flow modification elements, which is also substantially equal for each elongate member 201-204.

Within the first set of fluid flow modification elements 201-204, there is a variation in surface area of the second surface portion (generally along the direction of fluid flow) of the elongate members 201-204. The surface area of the second surface portion is determined in each case by the length l1 of each member 201-204 and the depth of each member 201-204 (not shown) in a direction parallel to the direction of flow of the fluid F. Since, in the case of the embodiment of FIG. 2, the length l1 is the same for each elongate member 201-204 in the first set of fluid flow modification elements, a variation in the surface area of the second surface portion is achieved by having different depths for one or more of the elongate members 201-204 in the direction of fluid flow. The generally elongate members 201 and 203, for example, are of a first type and have a first depth, and the generally elongate members 202 and 204 are of a second type and have a second depth that is different from the first depth. It will be appreciated that each elongate member 201-204 could have a different depth from each other, with the result that the second surface portion of each elongate member 201-204 would have a different surface area, which may be of value in certain implementations of the fluid flow modification apparatus. However, it has been found that, in a set of four generally elongate members, there is a benefit in having two members of a first depth and two members of a second depth. This arrangement can be used to affect the drag produced by the fluid flow modification apparatus and control the flow downstream of the fluid flow modification apparatus. Furthermore, it is preferred that members of the same depth are arranged substantially symmetrically about a center point C of the first set of fluid flow modification elements. This achieves a substantially symmetrical flow downstream of the fluid flow modification apparatus. In the embodiment of the fluid flow modification apparatus of FIG. 2, for example, the generally elongate members 201 and 203 are arranged opposite one another and symmetrically about the center point C of the first set of fluid flow modification members 201-204, and the generally elongate members 202 and 204 are also arranged opposite one another and symmetrically about the center point C.

Appropriately setting the depth of each of the elongate members 201, 202, 203 and 204 in the first set of fluid flow modification elements in the direction of fluid flow enables drag in the fluid flow to be controlled, and also allows the position and turbulence intensity at a meeting point of wakes produced by the fluid flow modification apparatus 200 to be managed.

It has been established empirically that a depth (in the direction of fluid flow) to thickness, t1 or t2, (transverse to the direction of fluid flow) ratio in the range of 0.1-10 is preferred, and that a depth to thickness (t1 or t2) ratio of approximately 0.6 is particularly preferred in the context of reducing drag in certain applications. To the extent that ratios of depth to thickness within these parameters are employed, it will be understood that they can be employed for some or all of the fluid flow modification elements 201-208.

As with the first set of fluid flow modification elements 201-204, it is also possible to have different depths for individual fluid flow modification elements 205-208 in the second set of fluid flow modification elements. In the case of the first group 210 of fluid flow modification elements in the second set of fluid flow modification elements, for example, generally elongate members of a first type 205 and 207 could have a first depth with the generally elongate members of a second type 206 and 208 having a different depth. Similar symmetrical constraints could be applied as discussed above with respect to the first set of fluid flow modification elements. The varying depths in the first group 210 of fluid flow modification elements in the second set of fluid flow modification elements could be replicated across the other groups 211-213 of the second set of fluid flow modification elements. Alternatively, the depths of the individual elongate members 205-208 could vary across groups 210-213 of the second set of fluid flow modification elements.

It will be appreciated that the depth of the fluid flow modification elements 201-208 can be varied, for example, by manufacturing generally elongate members of different depths at the outset or by adding layers on top of selected existing generally elongate members of equal thickness so that they become thicker. It is envisaged that the fluid flow modification apparatus 200 could be provided as a kit of parts, for example, so that the user could build fluid flow modification elements 201-208 of different depths according to requirements, and also have the flexibility of altering the depth of fluid flow modification elements 201-208 for using the fluid flow modification apparatus 200 for different applications.

The length l1, thickness or width t1 and depth of the generally elongate members 201-204 in the first set of fluid flow modification elements are, preferably, all greater than the respective length l2, thickness or width t2 and depth of elongate members 205-208. For the avoidance of doubt, this constraint applies regardless of the variation in depth of some of the elongate members. For example, although the elongate members 201 and 203 have a different depth to the elongate members 202 and 204, and the elongate members 205 and 207 have a different depth to the elongate members 206 and 208, every elongate member 205-208 in the second set of fluid flow modification members has a smaller depth than the smallest depth of the generally elongate members 201-204 in the first set of fluid flow modification members.

It can be seen that the second set of fluid flow modification elements 205-208 in FIG. 2 is effectively a multiplied repetition of the first set of fluid flow modification elements 201-204 on a different, smaller, scale. To the extent that the structure of the second set of fluid flow modification elements 205-208 replicates that of the first set of fluid flow modification elements 201-204, the fluid flow modification apparatus 200 can be considered to be a fractal or multi-scale configuration, with the first set of fluid flow modification elements 201-204 representing a first fractal or multi-scale level and the second set of fluid flow modification elements 205-208 representing a similar second fractal or multi-scale level. The term "fractal" may be understood here in the broadest sense of a geometrical structure that cannot be described by any non-multi-scale way.

Figure 3A:
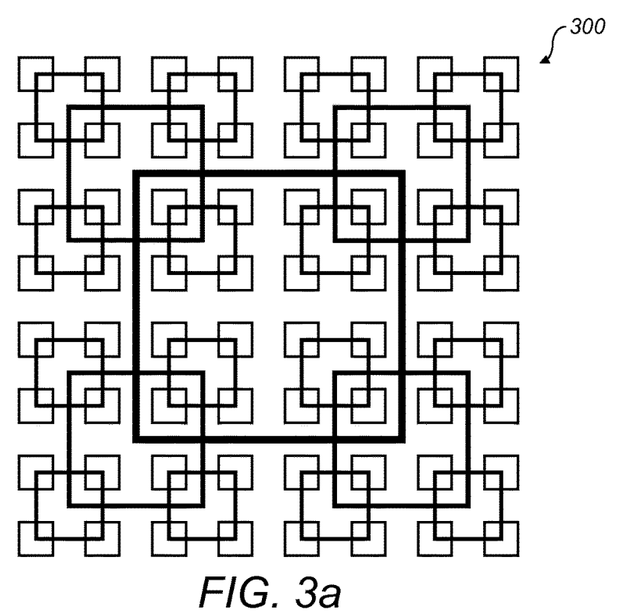
FIG. 3a shows a front view of an example of a fluid flow modification apparatus according to an alternative embodiment.
Figure 3B:
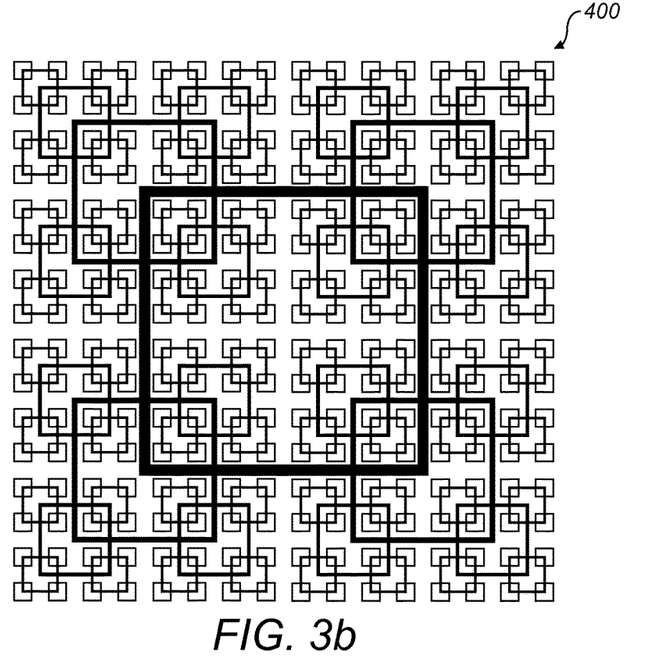
FIG. 3b shows a front view of an example of a fluid flow modification apparatus according to yet another alternative embodiment.
Figure 4A:
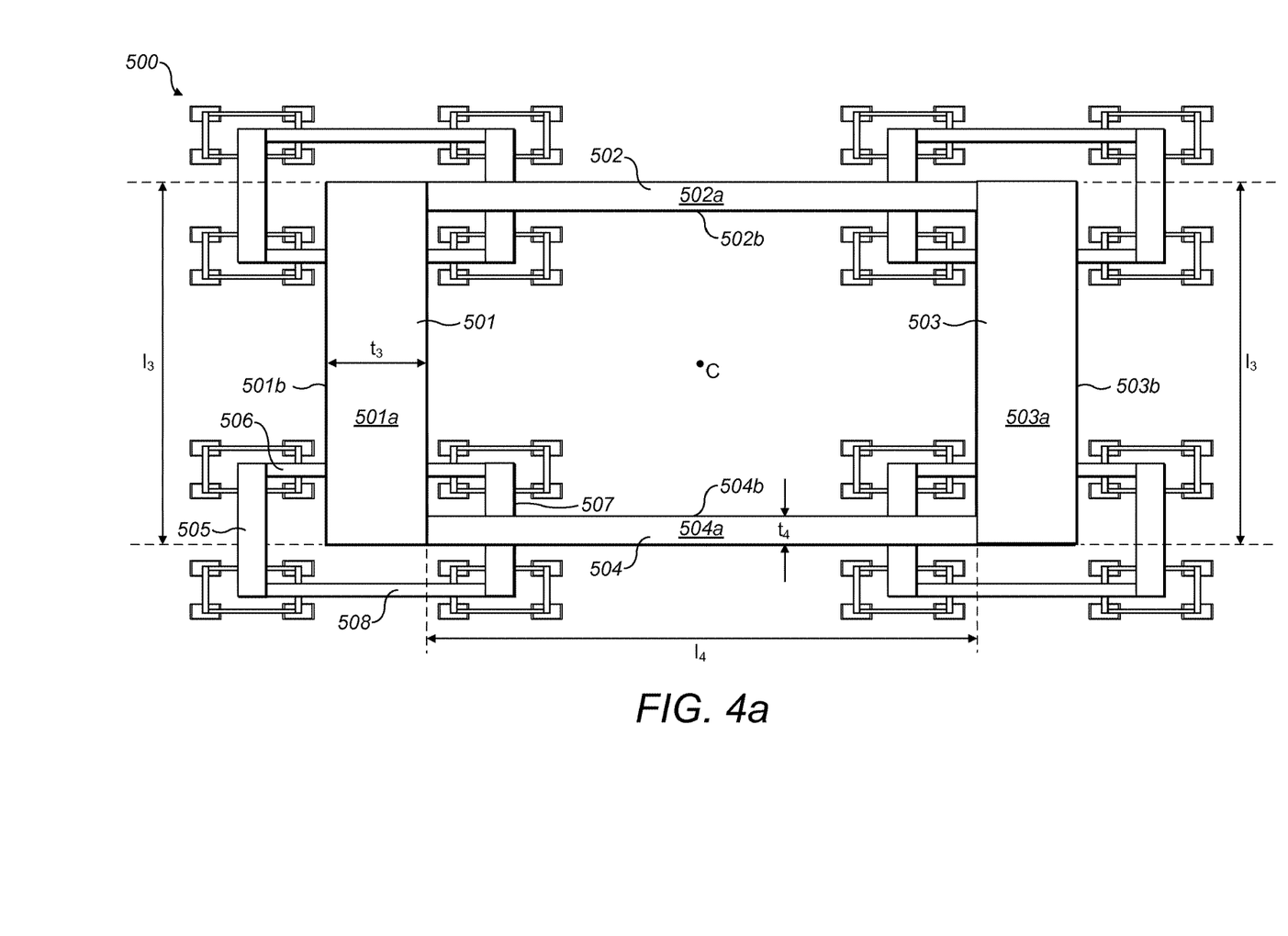
FIG. 4a shows a front view of an example of a fluid flow modification apparatus according to a further alternative embodiment.
Figure 4B:
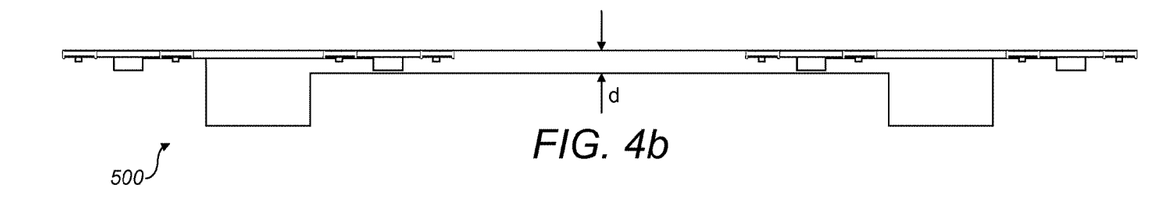
Figure 4C:
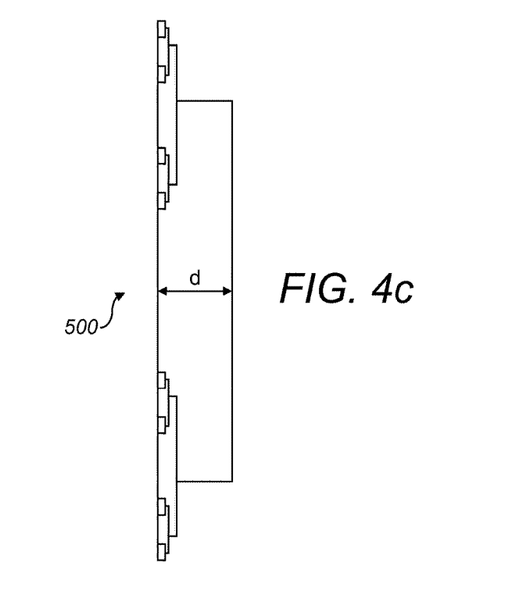
Figure 4D:
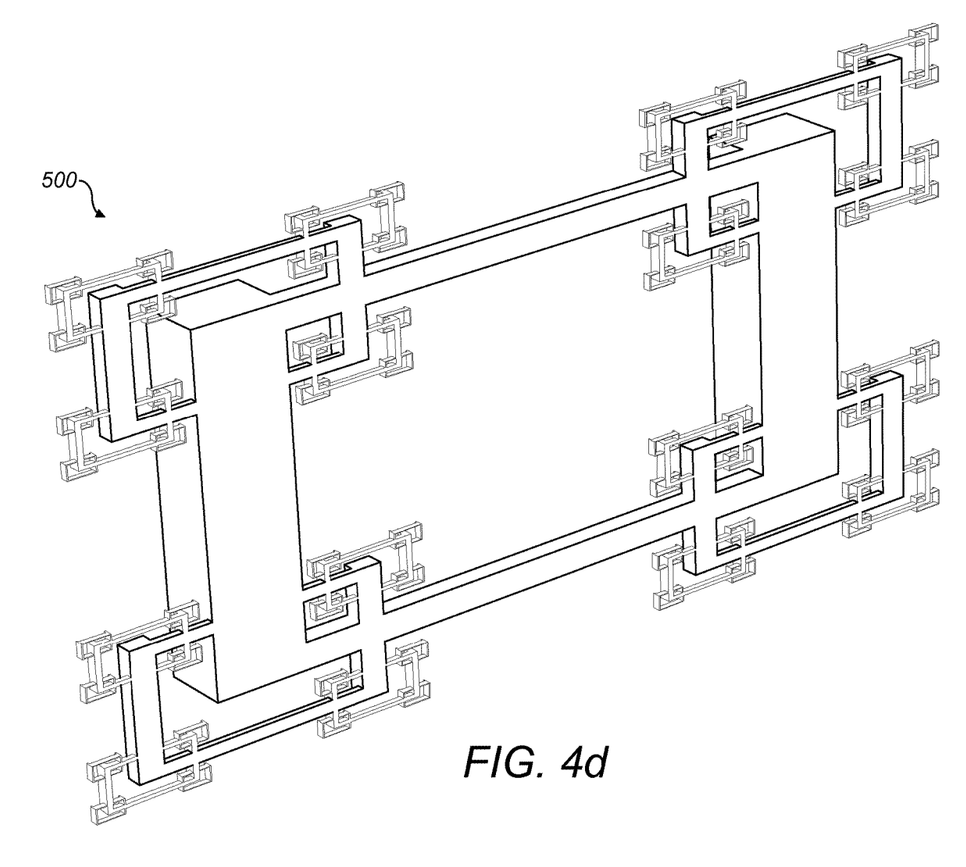
FIG. 4d shows a perspective view of an example of a fluid flow modification apparatus according to a further alternative embodiment.

The multi-scale or fractal configuration of the fluid flow modification apparatus is also represented in the alternative example embodiments of fluid flow modification apparatus 300, 400 shown in FIGS. 3a and 3b, respectively. It can be seen that the fluid flow modification apparatus 300 of FIG. 3a has four fractal or multi-scale levels, whereas the fluid flow modification apparatus 400 of FIG. 3b has five fractal or multi-scale levels.

It will be appreciated that at each fractal level there can be a variation in the depth (in the direction of fluid flow) of individual generally elongate members within that particular fractal level, with each individual generally elongate member either having a distinct depth or being grouped according to type with another individual generally elongate member of the same depth or with a plurality of individual generally elongate members having the same depths. The depth of fluid flow modification elements in increasing fractal levels can progressively decrease. Furthermore, the length and width/thickness of fluid flow modification elements in increasing fractal levels can progressively decrease.

FIGS. 4a-4d show an example of an embodiment of fluid flow modification apparatus 500 in which, in addition to the varying surface area of the second surface portion, the surface area of the first surface portion varies across fluid flow modification elements. The first set of fluid flow modification elements 501-504 at a first fractal level of the fluid flow modification apparatus 500 do not all have the same length and thickness/width; therefore, the surface area of the respective first surface portions 501a-504a is not the same. In particular, the fluid flow modification elements 501 and 503 have a thickness t3 and a length l3, whereas the fluid flow modification elements 502 and 504 have a thickness t4 and a length l4. It can be seen clearly in FIGS. 4a-4d the extent to which the depth, d, of the second surface portions 501b-504b of each fluid flow modification element 501-504 in the first set of fluid flow modification elements varies. The fluid flow modification elements 501 and 503 can, therefore, be considered to be a first type of fluid flow modification element within the first set of fluid flow modification elements, whereas the fluid flow modification elements 502 and 504 can be considered to be a second type of fluid flow modification element within the first set of fluid flow modification elements.

Appropriate setting of the length and/or thickness of the fluid flow modification elements provides greater control over the location of wakes that result from the fluid flow modification apparatus, particularly the location at which wakes from the individual fluid flow modification elements meet. As is the case with varying depth of fluid flow modification elements within a given set of fluid flow modification elements, it has been found that, in a set of four generally elongate members, there is a benefit in having two members with a first surface portion of a first surface area and two members with a first surface portion of a second surface area, the first and second surface portion surface areas being different. This has enabled the blockage caused by the fluid flow modification elements to be limited, thus reducing the work required to achieve fluid flow around the fluid flow modification apparatus. This arrangement also facilitates control of where wakes arising from the fluid flow modification elements meet, which is determined by the thickness and separation of individual fluid flow modification elements. It is desirable, for example, for wakes from the fluid flow modification elements 501a, 502a, 503a and 504a to meet at a single location. Furthermore, it is preferred that members having the same first surface portion surface area are arranged substantially symmetrically about a center point C of the first set of fluid flow modification elements 501-504. This achieves a symmetrical flow pattern. In the embodiment of the fluid flow modification apparatus of FIGS. 4a-4d, for example, the generally elongate members 501 and 503 are arranged opposite one another and symmetrically about the center point C of the first set of fluid flow modification members 501-504, and the generally elongate members 502 and 504 are also arranged opposite one another and symmetrically about the center point C.

A further factor in controlling position of wakes created by the fluid flow modification elements is the length of individual fluid flow modification elements. A length, l3 or l4 (transverse to the direction of fluid flow) to thickness, t3 or t4 (transverse to the direction of fluid flow) ratio in the range of 2-100 is preferred, and a length, l3 or l4 to thickness, t3 or t4 ratio in the range of 2-50 is particularly preferred. To the extent that ratios of length to thickness within these parameters are employed, it will be understood that they can be employed for some or all of the fluid flow modification elements.

FIGS. 4a-4d also show that similar variations in the length, thickness/width and depth exist in the second set of fluid flow modification elements 505-508, which effectively represent a second fractal level of the fluid flow modification apparatus 500 in that their structure replicates and multiplies that of the first set of fluid flow modification elements 501-504.

Similarly, the third and fourth fractal levels of the fluid flow modification apparatus 500 include third and fourth sets of fluid flow modification elements, respectively, and each set of fluid flow modification elements also demonstrates varying length, thickness/width and depth within itself.

Reference numerals have been omitted in the third and fourth sets of fluid flow modification elements to improve clarity in FIGS. 4a-4d.

Figure 5A:
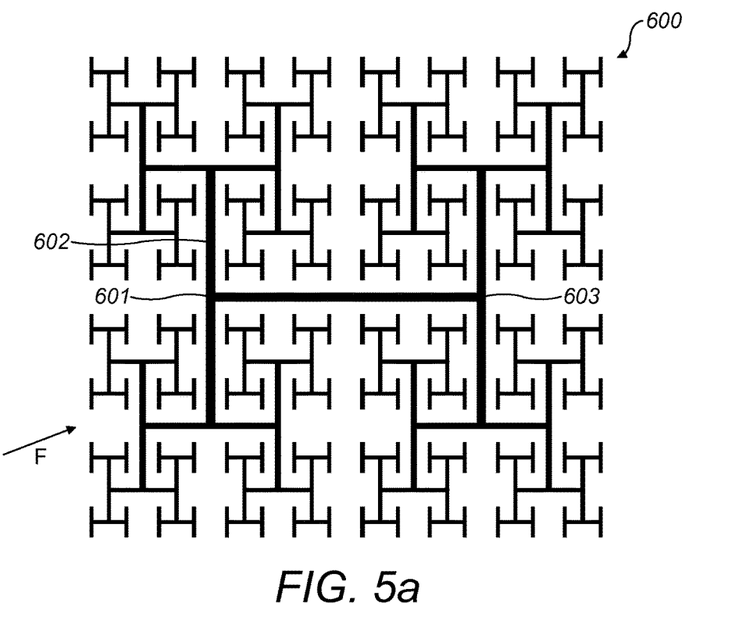
FIG. 5a shows a front view of an example of a fluid flow modification apparatus according to an alternative embodiment.

FIGS. 5a and 5b illustrate alternative examples of embodiments of fluid flow modification apparatus 600, 700. In FIG. 5a, the fluid flow modification apparatus 600 has a first set of fluid flow modification elements 601, 602 and 603 that have an approximately H-shaped configuration, the fluid flow modification element 601 joining the fluid flow modification elements 602 and 603 part-way along their length, either by integral formation therewith or attachment thereto. Although the length and width/thickness of each fluid flow modification element 601, 602 and 603 is the same, the fluid flow modification elements 602 and 603 have a depth in the direction of flow of the fluid F which is different from the depth of the fluid flow modification element 601. Similar differences in depth apply to other sets of fluid flow modification elements included in further levels of the fluid flow modification apparatus 600, as has been described above in relation to other embodiments, including for example the embodiments illustrated in FIGS. 2, 3a and 3b.

Figure 5B:
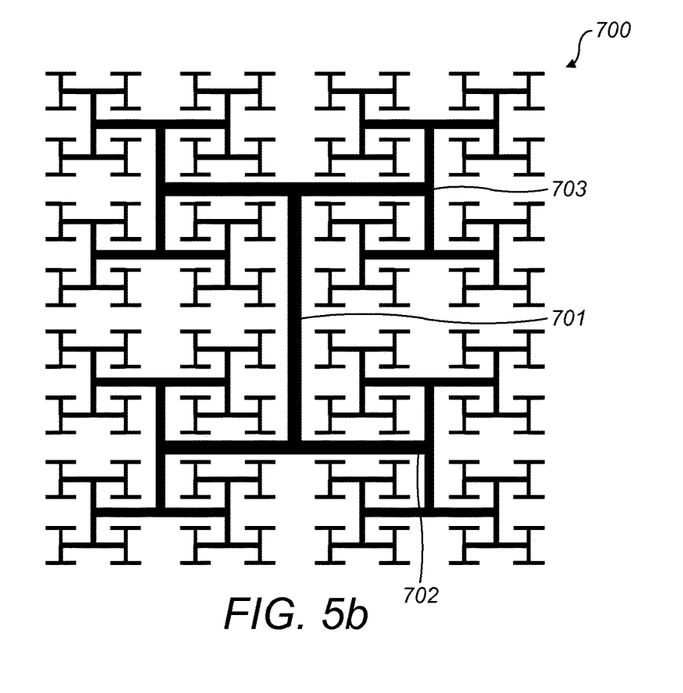
FIG. 5b shows a front view of an example of a fluid flow modification apparatus according to yet a further alternative embodiment.

The fluid flow modification apparatus 700 shown in FIG. 5b is the same as that shown in FIG. 5a, with the exception that the first set of fluid flow modification elements 701, 702 and 703 are arranged in an I-shaped configuration, rather than an H-shaped configuration.

It will be appreciated that any of the embodiments of fluid flow modification apparatus described above can be made from a wide range of materials, including, for example, plastics, carbon fiber, wood, or metal.

The fluid flow modification elements comprising the fluid flow modification apparatus could be solid or could be hollow, depending on manufacturing and/or strength and rigidity requirements.

A method for modifying fluid flow characteristics in a fluid flow field includes placing a fluid flow modification apparatus in accordance with any of the embodiments described above into a fluid flow field and supporting it, such that the fluid flow modification apparatus is securely mounted therein. Should it be necessary, the dimensions of individual fluid flow modification elements can be altered to affect the characteristics of the fluid flow field.

Embodiments of the fluid flow modification apparatus and method described herein can be used in a variety of applications. For example, the fluid flow modification apparatus could be used to create a fluid flow profile in a wind tunnel that would effectively replicate eddy currents experienced around tall structures such as buildings, bridges or wind turbines, and as such, would be suitable for testing components of such structures for resilience.

Embodiments of the fluid flow modification apparatus could also be used to create a desired flow profile in applications such as mixing, ventilation, heat transfer and aeronautics.

The above embodiments are to be understood as illustrative examples only. Further embodiments are envisaged. For example, the fluid flow modification elements do not have to be in the form of generally elongate members and could be of any suitable configuration. Similarly, each set of fluid flow modification elements could be arranged in any suitable shape and is not limited to the square, rectangular, H- and I-shaped configurations discussed above; the shape of each set of fluid flow modification elements could be irregular. It is also conceivable that different sets of fluid flow modification elements would have different configurations from other sets of fluid flow modification elements within the same fluid flow modification apparatus. It is not necessary for groups of fluid flow modification elements, such as 210, 211, 212 and 213, to be homogenous. The group 210 could have a different configuration and/or dimensions from the group 211, for example.

It should be appreciated that a number of fluid flow modification apparatus could be used in combination to affect flow profile within a fluid flow.

Furthermore, it would be possible to combine the embodiments of fluid flow modification apparatus described herein with at least one insert, as described in European patent no. 2274523B, the entire content of which is incorporated herein by reference.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A fluid flow modification apparatus comprising:
a plurality of fluid flow modification elements each having a first surface portion against which a fluid (F) can flow and a second surface portion along which the fluid (F) can flow, said plurality of fluid flow modification elements being arranged in a number of sets, wherein
a first set of fluid flow modification elements comprises a plurality of fluid flow modification elements with a first surface portion having a first surface area; and
a second set of fluid flow modification elements comprises a plurality of fluid flow modification elements with a first surface portion having a second surface area different to the first surface area,
the first set of fluid flow modification elements including a first type of fluid flow modification element and a second type of fluid flow modification element, a depth of the second surface portion in the direction of flow of the fluid of the first type of fluid flow modification element being different from a depth of the second surface portion in the direction of flow of the fluid of the second type of fluid flow modification element, wherein a ratio of the depth of the second surface portion of at least one of the fluid flow modification elements in the direction of flow of the fluid (F) to a width of the first surface portion of said fluid flow modification element across the direction of flow of the fluid (F) is within the range 0.1 to 10.

2. The fluid flow modification apparatus of claim 1, wherein the first type of fluid flow modification element in the first set of fluid flow modification elements has a first surface portion surface area that is different from a first surface portion surface area of the second type of fluid flow modification element in the first set of fluid flow modification elements.

3. The fluid flow modification apparatus of claim 1, wherein the second set of fluid flow modification elements includes a first type of fluid flow modification element and a second type of fluid flow modification element, a depth of the second surface portion in the direction of flow of the fluid of the first type of fluid flow modification element being different from a depth of the second surface portion in the direction of flow of the fluid of the second type of fluid flow modification element.

4. The fluid flow modification apparatus of claim 1, wherein the first set of fluid flow modification elements and the second set of fluid flow modification elements are arranged in a fractal configuration.

5. The fluid flow modification apparatus of claim 4, wherein the first set of fluid flow modification elements is arranged at a first level of the fractal configuration and the second set of fluid flow modification elements is arranged at a second level of the fractal configuration.

6. The fluid flow modification apparatus of claim 1, wherein a support is provided on the fluid flow modification apparatus for mounting the apparatus, in use.

7. The fluid flow modification apparatus of claim 1, wherein the fluid flow modification elements within the respective first and second sets of fluid flow modification elements are attached to one another.

8. The fluid flow modification apparatus of claim 7, wherein the fluid flow modification elements within the respective first and second sets of fluid flow modification elements are joined to one another end to end.

9. The fluid flow modification apparatus of claim 7, wherein the fluid flow modification elements within the respective first and second sets of fluid flow modification elements are joined to one another partway along their length.

10. The fluid flow modification apparatus of claim 1, wherein the fluid flow modification elements within the respective first and second sets of fluid flow modification elements are integrally formed with one another.

11. The fluid flow modification apparatus of claim 1, wherein the fluid flow modification elements are generally elongate in configuration.

12. The fluid flow modification apparatus of claim 1, wherein the first type of fluid flow modification element and the second type of fluid flow modification element are each arranged substantially symmetrically about a center point of the fluid flow modification element.

13. The fluid flow modification apparatus of claim 1, wherein a ratio of the depth of the second surface portion of at least one of the fluid flow modification elements in the direction of flow of the fluid (F) to a width of the first surface portion of said fluid flow modification element across the direction of flow of the fluid (F) is 0.6.

* * * * *